US011956590B2

(12) United States Patent
Chen et al.

(10) Patent No.: US 11,956,590 B2
(45) Date of Patent: Apr. 9, 2024

(54) FLEXIBLE DIFFERENTIAL MICROPHONE ARRAYS WITH FRACTIONAL ORDER

(71) Applicant: Northwestern Polytechnical University, Shanxi (CN)

(72) Inventors: Jingdong Chen, Shanxi (CN); Gongping Huang, Shanxi (CN)

( * ) Notice: Subject to any disclaimer, the term of this patent is extended or adjusted under 35 U.S.C. 154(b) by 398 days.

(21) Appl. No.: 17/413,111

(22) PCT Filed: Mar. 19, 2019

(86) PCT No.: PCT/CN2019/078607
§ 371 (c)(1),
(2) Date: Jun. 11, 2021

(87) PCT Pub. No.: WO2020/186434
PCT Pub. Date: Sep. 24, 2020

(65) Prior Publication Data
US 2022/0030353 A1 Jan. 27, 2022

(51) Int. Cl.
*H04R 1/32* (2006.01)
*H04R 3/00* (2006.01)

(52) U.S. Cl.
CPC ............. *H04R 1/326* (2013.01); *H04R 3/005* (2013.01)

(58) Field of Classification Search
CPC .. H04R 1/326; H04R 1/406; H04R 2201/401; H04R 3/005; H04R 1/00; H04R 3/00;
(Continued)

(56) References Cited

U.S. PATENT DOCUMENTS 9,930,448 B1 * 3/2018 Chen ...................... H04R 3/005
10,019,981 B1 * 7/2018 Porter .................... G10K 11/34
(Continued)

FOREIGN PATENT DOCUMENTS

CN 1515129 A 7/2004
CN 102474680 A 5/2012
(Continued)

OTHER PUBLICATIONS

Hung, Guoping et al., A Flexible High Directivity Beamformer with Spherical microphone Arrays, The Journal of the Acoustical Society of America, pp. 3024-3035, May 22, 2018 (May 22, 2018).*
(Continued)

*Primary Examiner* — Lun-See Lao
(74) *Attorney, Agent, or Firm* — Zhong Law LLC

(57) ABSTRACT

A beamformer, for a differential microphone array (DMA) including a number M of microphones, is constructed based on a specified target directivity factor (DF) value for the DMA. An N order beampattern is generated for the DMA, wherein N is an integer and a first DF value corresponding to the N order beampattern is greater than the target DF value. An N−1 order beampattern is generated for the DMA, wherein a second DF value corresponding to the N−1 order beampattern is greater than the target DF value. A fractional order beampattern is generated for the DMA, wherein a third DF value corresponding to the fractional order beampattern matches the target DF value and the fractional order beampattern comprises a first fractional contribution from the N order beampattern and a second fractional contribution from the N−1 order beampattern.

20 Claims, 8 Drawing Sheets

(58) Field of Classification Search
CPC H04R 29/00; H04R 2201/00; H04R 2217/00; H04R 2420/00
USPC ............................................... 381/92; 700/94
See application file for complete search history.

(56) References Cited

U.S. PATENT DOCUMENTS

| | | | | |
|---|---|---|---|---|
| 11,523,212 | B2 * | 12/2022 | Ansai ..................... | H04R 19/04 |
| 2007/0076900 | A1 | 4/2007 | Kellermann et al. | |

FOREIGN PATENT DOCUMENTS

| | | | |
|---|---|---|---|
| CN | 103856866 | A | 6/2014 |
| CN | 104424953 | A | 3/2015 |
| EP | 3007461 | A1 | 4/2016 |
| WO | 2018087590 | A2 | 5/2018 |

OTHER PUBLICATIONS

First Office Action and Search Report dated Aug. 10, 2022 received in 201980092098.9, pp. 8.
Huang et al., A Flexible High Directivity Beamformer with Spherical Microphone Arrays, Journal of the Acoustical Society of America, 2016. pp. 3024-3030.
International Search Report and Written Opinion dated Dec. 17, 2019 received in PCT/CN2019/078607, pp. 1-8.
Huang et al., "A Flexible High Directivity Beamformer with Spherical Microphone Arrays", The Journal of the Acoustical Society of America, May 22, 2018, vol. 143, No. 5, pp. 3024-3035.

* cited by examiner

600B

600C

FLEXIBLE DIFFERENTIAL MICROPHONE ARRAYS WITH FRACTIONAL ORDER

CROSS-REFERENCE TO RELATED APPLICATIONS

This application is the U.S. national stage of PCT/CN2019/078607 filed Mar. 19, 2019, which is hereby incorporated in reference in its entirety.

TECHNICAL FIELD

This disclosure relates to microphone arrays and, in particular, to a flexible differential microphone array (FDMA) with a fractional order beamformer.

BACKGROUND

In voice communications between humans and human-machine speech interfaces, a signal of interest picked up by microphone sensors is commonly contaminated by unwanted elements such as additive noise, reverberation, and interference, which may impair the fidelity and quality of the signal of interest and also affect the performance of subsequent operations such as, for example, automatic speech recognition (ASR) based on the signal. In order to deal with these adverse effects and recover the signal of interest, a microphone array with a spatial filter called a beamformer may be used for directional signal transmission or reception. A microphone array may contain multiple microphones arranged according to a geometric relation such as, for example, on a line, on a planar surface, on a three-dimensional surface, or in a three-dimensional space. Each microphone in the microphone array may capture a version of a sound signal originating from a sound source and convert the captured signals into electronic signals. Each version of the signal may represent the sound source captured at a particular incident angle with respect to a reference point (e.g., a reference microphone location in the array) at a particular time. The time may be recorded in order to determine a time delay for each microphone with respect to the reference point.

A differential microphone array (DMA) uses signal processing techniques to obtain a directional response to the source signal based on differentials of pairs of the source signals. The differentials can be obtained by combining the electronic signals from the microphones of the DMA.

BRIEF DESCRIPTION OF THE DRAWINGS

The present disclosure is illustrated by way of example, and not by way of limitation, in the figures of the accompanying drawings.

DETAILED DESCRIPTION

Figure 1:
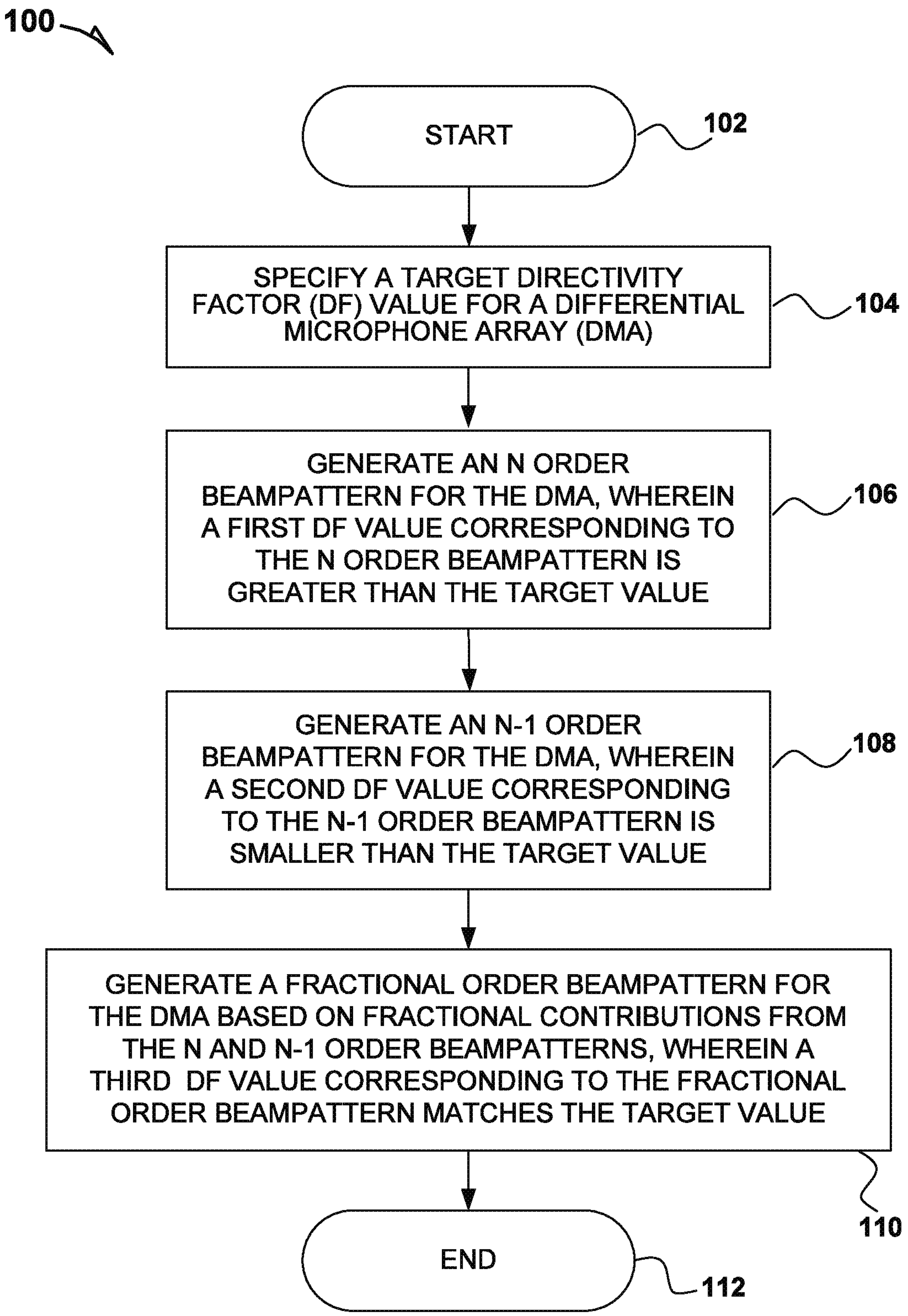
FIG. 1 is a flow diagram illustrating a method for constructing a beamformer with a fractional order beampattern based on a target directivity factor (DF) value for an FDMA, according to an implementation of the present disclosure.

Compared with a single microphone, the sound signals received at different microphones in the microphone array include redundancy that may be used to calculate an estimate of a sound source to achieve certain objectives such as, for example, noise reduction/speech enhancement, automatic speech recognition (ASR), sound source separation, de-reverberation, spatial sound recording, and source localization and tracking. The microphone array may be communicatively coupled to a processing device (e.g., a digital signal processor (DSP) or a central processing unit (CPU)) that includes circuits programmed to implement a beamformer to calculate the estimate of the sound source.

A beamformer is a spatial filter that uses the multiple versions of the sound signal captured by the microphones in the microphone array to identify the sound source according to certain optimization rules. Some implementations of the beamformers are not effective in dealing with noise components at low frequencies because the beam-widths (i.e., the widths of the main lobes in the frequency domain) associated with the beamformers are inversely proportional to the frequency. To counter the non-uniform frequency response of beamformers, differential microphone arrays (DMAs) have been used to achieve substantially frequency-invariant beampatterns. A beampattern (also known as a directivity pattern) reflects the sensitivity of the beamformer to a plane wave impinging on the DMA from a particular angular direction. DMAs may contain an array of microphone sensors that are responsive to the spatial derivatives of the acoustic pressure field generated by the sound source. An FDMA may include flexibly distributed microphones (e.g., linear, circular or other array structure) that are arranged on a common plenary platform.

DMAs can measure the derivatives (at different orders of derivatives) of the sound signals captured by the microphone, where the collection of the sound signals forms an acoustic field associated with the microphone array. For example, a first-order DMA beamformer, formed using the difference between a pair of two microphones (either adjacent or non-adjacent), may measure the first-order derivative of the acoustic pressure field, and a second-order DMA beamformer, formed using the difference between a pair of two first-order differences of the first-order DMA, may measure the second-order derivatives of the acoustic pressure field, where the first-order DMA includes at least two microphones, and the second-order DMA includes at least three microphones. Thus, an Nth order DMA beamformer may measure the Nth order derivatives of the acoustic pressure field, where the Nth order DMA includes at least N+1 microphones. One aspect of a beampattern of a microphone array can be quantified by the directivity factor (or directivity) which is the capacity of the beampattern to maximize the ratio of its sensitivity in the look direction to its average sensitivity over all directions. The look direction is an impinging angle of the sound signal that has the maximum sensitivity. The DF of a DMA beampattern may increase with the order of the DMA. However, a larger order DMA can be very sensitive to noise generated by the hardware elements of each microphone of the DMA itself, referred to as white noise gain (WNG).

One way to reduce the WNG is to increase the number of microphones without increasing the order of the DMA beamformer. However, with a fixed array structure and number of microphones for a DMA, if the WNG of the DMA beamformer cannot meet a robustness requirement (e.g., minimum tolerable WNG), the order of the DMA beamformer may need to be reduced from the current order to a lower positive integer number order. The lower order would adversely affect the DF and therefore, in DMA applications where the number of microphones is fixed, it would be beneficial to be able to lower the order of the DMA beamformer to a certain level. To address these technical problems, implementations of the disclosure provide a microphone array that may be associated with a beamformer that can have integer or fractional order of beampatterns to satisfy the robustness requirement while maintaining a desirable (or target) DF.

According to the implementations, a DMA beamformer with fractional orders may achieve a continuous compromise between a performance (e.g., DF vs. WNG) of the maximum designable order (e.g., Nth order) and the omnidirectional order (e.g., 0 order). A fractional order beampattern is generated to achieve the continuous compromise in performance between the order of N and 0. To construct DMA beamformers, the beamformer's beampattern (e.g., directivity pattern) is approximated using the Jacobi-Anger expansion, then a proper beamforming filter is determined so that its beampattern is as close as possible to a desired frequency-invariant beampattern. Furthermore, a value representing a fractional order for the constructed beamformer may be determined based on a specified DF or WNG value for a DMA beamformer of said fractional order, as explained below with respect to FIG. 1 and FIG. 2.

FIG. 1 is a flow diagram illustrating a method 100 for constructing a beamformer with a fractional order beampattern based on a target DF value for an FDMA, according to an implementation of the present disclosure. The method 100 may be performed by processing logic that comprises hardware (e.g., circuitry, dedicated logic, programmable logic, microcode, etc.), software (e.g., instructions run on a processing device to perform hardware simulation), or a combination thereof.

For simplicity of explanation, methods are depicted and described as a series of acts. However, acts in accordance with this disclosure can occur in various orders and/or concurrently, and with other acts not presented and described herein. Furthermore, not all illustrated acts may be required to implement the methods in accordance with the disclosed subject matter. In addition, the methods could alternatively be represented as a series of interrelated states via a state diagram or events. Additionally, it should be appreciated that the methods disclosed in this specification are capable of being stored on an article of manufacture to facilitate transporting and transferring such methods to computing devices. The term article of manufacture, as used herein, is intended to encompass a computer program accessible from any computer-readable device or storage media. In one implementation, the methods may be performed by the fractional beamformer 310 executed on the processing device 306 as shown in FIG. 3.

Figure 3:
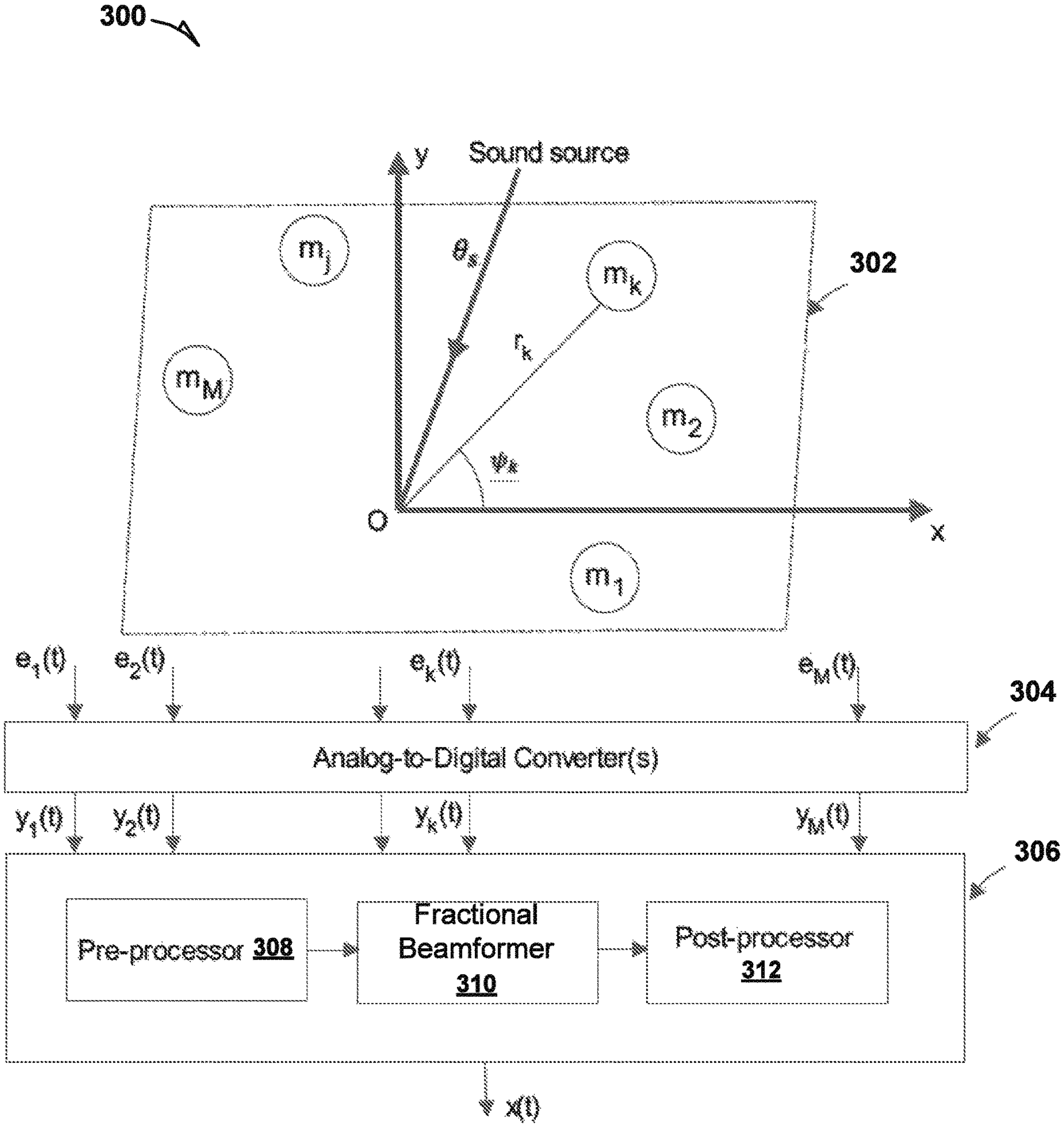
FIG. 3 shows an FDMA and beamformer system according to an implementation of the present disclosure.

Referring to FIG. 1, at 102, the processing device may start executing operations to construct a beamformer for a DMA with M microphones flexibly distributed on a plane, e.g., FDMA 302 of FIG. 3. Without limitation, the center of the DMA may be assumed to coincide with the origin of a two-dimensional Cartesian coordinate system with the azimuthal angles being measured anti-clockwise from the x axis. In this case, the $m^{th}$ array element (e.g., the $m^{th}$ microphone in FDMA 302) may have a radius of $r_m$, and an angular position of $\psi_m$, and the direction of the source signal to the DMA may be parameterized by the azimuthal angle $\theta_s$. A steering vector may represent the relative phase shifts for an incident far-field waveform across the microphones of the DMA. With the features of the DMA, as described above, a steering vector for the DMA may be defined as:

$$d(\omega,\theta_s)=[e^{j\omega 1 cos(\theta_s-\psi 1)} e^{j\omega 2 cos(\theta_s-\psi 2)} \dots e^{j\omega M cos(\theta_s-\psi M)}]^T,$$

where the superscript T is the transpose operator, j is the imaginary unit with $j^2=-1$, $\omega=2\pi f$ is the angular frequency, and f>0 is the temporal frequency.

At 104, the processing device may specify a target DF value for the DMA. As noted above, the DF represents the ability of a beamformer in suppressing spatial noise from directions other than the look direction. The DF associated with the DMA, as described above, may be written as:

$$D[h(\omega)] = \frac{|h^H(\omega)d(\omega, \theta_s)|^2}{h^H(\omega)\Gamma_d(\omega)h(\omega)},$$

where $h(\omega)=[H_1(\omega)\ H_2(\omega) \dots H_m(\omega)]^T$ is a global filter for a beamformer associated with the DMA, the superscript H represents the conjugate-transpose operator, $[H_1(\omega)\ H_1(\omega) \dots H_M(\omega)]^T$ are the spatial filter of M microphones, $\Gamma_d(\omega)$ is the pseudo-coherence matrix of the noise signal in a diffuse (spherically isotropic) noise field, and the (i, j)th element of $\Gamma_d(\omega)$ is $$|\Gamma_d(\omega)|_{ij} = sinc\left(\frac{\omega\delta_{ij}}{c}\right),$$

where $\delta_{ij}$ is the distance between microphone elements i and j, and c is a constant of the sound speed.

At 106, the processing device may generate an N order beampattern for the DMA, wherein N is an integer and a first DF value corresponding to the N order beampattern is greater than the target DF value. In this situation, the N order beampattern exceeds the target DF value and therefore negatively affects WNG values more than is necessary, e.g., more spatially white noise is present than is needed to achieve the target DF value.

As noted above, a DMA may be associated with a beampattern that reflects the sensitivity of a corresponding beamformer to a plane wave impinging on DMA from a particular angular direction θ. The beampattern for a plane wave impinging from an angle θ, on the DMA described above, may be defined as:

$$B[h(\omega),\theta]=h^H(\omega)d(\omega,\theta)=\Sigma_{m=1}^{M} H^*_m(\omega)e^{j\omega M cos(\theta-\psi M)}.$$

Therefore, for such a DMA, a target frequency-invariant beampattern corresponding to the angle $\theta_s$, which is the incident angle of the sound signal, can be written as $B(\alpha_N,$ $\theta-\theta_s)=\Sigma_{n=0}^{N}\alpha_{N,n}\cos(n(\theta-\theta_s))$, where $\alpha_{N,n}$ are the real coefficients that determines the shape of the different beampatterns of the Nth-order DMA. The $B(\alpha_N, \theta-\theta_s)$ may be rewritten as:

$$B(b_N,\theta-\theta_s=\Sigma_{n=-N}^{N} b_{N,n} e^{jn(\theta-\theta_s)}=[Y(\theta_s)b_N]^T P_e(\theta),$$

where $b_{N,0}=\alpha_{N,0}$, $b_{N,i}=\frac{1}{2}\alpha_{N,i}$, $i=\pm1, \pm2, \ldots, \pm N$, $$Y(\theta_s)=\mathrm{diag}(e^{jN\theta_s}, \ldots, 1, \ldots, e^{-jN\theta_s})$$

is a (2N+1)×(2N+1) diagonal matrix, and $$b_N=[b_{N,-N} \ldots b_{N,0} \ldots b_{N,N}]^T, \text{ and}$$

$$P_e(\theta)=[e^{-jN\theta} \ldots 1 \ldots e^{jN\theta}]^T,$$

are vectors of length 2N+1, respectively. The beampattern $B[h(\omega), \theta]$ after applying the beamforming filter $h(\omega)$ should match the target beampattern $B(b_N, \theta-\theta_s)$. For example, the target (or desired) beampattern may be a second-order hypercardioid whose coefficients are:

$$a_N=\left[\frac{1}{5}\ \frac{2}{5}\ \frac{2}{5}\right]^T \text{ and } b_N=\left[\frac{1}{5}\ \frac{1}{5}\ \frac{1}{5}\ \frac{1}{5}\ \frac{1}{5}\right]^T.$$

At 108, the processing device may generate an N−1 order beampattern for the DMA, wherein a second DF value corresponding to the N−1 order beampattern is smaller than the target DF value. In this situation, the N−1 order does not reach the target DF value and therefore more diffuse noise (e.g., from directions not being focused on) is present than is necessary for the target DF value, e.g., more noise is present than is desired (e.g., targeted) from directions other than the look direction.

At 110, the processing device may generate a fractional order beampattern for the DMA, wherein a third DF value corresponding to the fractional order beampattern matches the target DF value and the fractional order beampattern comprises a first fractional contribution from the N order beampattern and a second fractional contribution from the N−1 order beampattern.

A beampattern that achieves a compromise (e.g., something intermediate) between the performance (e.g., DF vs. WNG) of beampatterns of orders N through 0 may be defined as:

$$B(\alpha_N\theta-\theta_s)=\Sigma_{N'=0}^{N}\alpha_{N'}B_{N'}(n(\theta-\theta_s))$$

where $\alpha_N=[\alpha_0\alpha_1 \ldots \alpha_N]^T$, with $0\geq\alpha N'\leq1$, and $\Sigma_{N'=0}^{N}\alpha_N=1$. The compromise beampattern may be written as:

$$B(\alpha_N\theta-\theta_s)=\Sigma_{N'=-0}^{N} b'_{N',n} e^{jn(\varnothing-\varnothing_s)},$$

where $$b'_{N',n}=\Sigma_{N'=0}^{N}\alpha_{N'}b'_{N',n},$$

with N'=0, 1, . . . , N as the weighted coefficient for the component $e^{jn\varnothing}$. Furthermore, in the case that n>N', the value of $b'_{N',n}$ may default to 0.

Therefore, by properly choosing the values of $\alpha_{N'}$, the above-defined compromise beampattern may achieve continuous performance compromises between the N and 0 (omnidirectional) order beampatterns. There are N+1 different parameters in the compromise beampattern, as defined above, which may be determined in a multi-stage way, i.e., a compromise can be established between the N and (N−1) order beampattern, and if not, then between (N−1) and (N−2) order, and so on until to the omnidirectional. To begin, a fractional (N−1+α) [abbreviated as $(N-1)_\alpha$ below] order beampattern that achieves a compromise between the beampatterns of order N and (N−1) is defined as:

$$B_{(N-1)_\alpha}(\theta-\theta_s)=\alpha\beta_N(\theta-\theta_s)+(1-\alpha)B_{N-1}(\theta-\theta_s)$$

where $\alpha\in[0, 1]$ is a real weight that determines the degree of compromise between the N order and (N−1) order.

The fractional order beampattern between the beampatterns of order N and (N−1) may also be rewritten as:

$$B_{(N-1)\alpha}(\theta-\theta_s)=\Sigma_{n=0}^{N} b_{(N-1)_\alpha,n} e^{jn\theta_s} e^{jn\theta}=[Y(\theta_s)b_{(N-1)_\alpha}]^T P_e(\theta).$$

where $$b_{(N-1)_\alpha,n}=\alpha, b_{N,n}+(1-\alpha)b_{(N-1),n}, \text{ and}$$

$$b_{(N-1)_\alpha}=\alpha, b_N+(1-\alpha)\tilde{b}_{(N-1)},$$

where $\tilde{b}_{(N-1)}=[0 \ldots b^T_{N-1} \ldots 0]^T$ is a zero-padded coefficient vector of length 2N+1.

Consequently, the beampattern that achieves a continuous compromise between the N and 0 order beampatterns is defined as $$B_{N_\alpha}(\theta-\theta_s)=[Y(\theta_s)b_{N_\alpha}]^T P_e(\theta)$$

where $\mathcal{N}_\alpha=\mathcal{N}+\alpha(0\leqslant\mathcal{N}_\alpha\leqslant N)$ is the fractional order of the beampattern, with $\mathcal{N}$, ($\mathcal{N}\in\{N, N-1, \ldots, 0\}$), being the integer portion, and α, ($\alpha\in[0, 1]$) being the fractional portion. The fractional order $\mathcal{N}_\alpha$ and the corresponding vector $b_{\mathcal{N}_\alpha}$ can be defined in a multi-stage way as:

$$N_a=N\text{: } b_{\mathcal{N}_\alpha}=b_N$$

$$\mathcal{N}_\alpha=(N-1)_\alpha\text{: } b_{\mathcal{N}_\alpha}=\alpha b_N+(1-\alpha)\tilde{b}_{N-1}$$

$$\mathcal{N}_\alpha=(N-2)_\alpha\text{: } b_{\mathcal{N}_\alpha}=\alpha\tilde{b}_{N-1}+(1-\alpha)\tilde{b}_{N-2}$$

$$\mathcal{N}_\alpha=0_\alpha\text{: } b_{\mathcal{N}_\alpha}=\alpha\tilde{b}_1+(1-\alpha)\tilde{b}_0,$$

where $$\tilde{\boldsymbol{b}}_{\mathcal{N}}=[0 \ldots b^T_{\mathcal{N}} \ldots 0]^T,$$

with N=0, 1, . . . , N, is the zero-padded coefficients vector of length 2N+1. Therefore, $$\boldsymbol{b}_{\mathcal{N}_\alpha}=\alpha.\ \tilde{b}_{\mathcal{N}+1}+(1-\alpha)\ \tilde{b}_{\mathcal{N}}=[\boldsymbol{b}_{\mathcal{N}_\alpha,-N} \ldots \boldsymbol{b}_{\mathcal{N}_\alpha,0} \ldots \boldsymbol{b}_{\mathcal{N}_\alpha,N}]^T,$$

where $\boldsymbol{b}_{\mathcal{N}_\alpha,n}=\alpha\ \boldsymbol{b}_{\mathcal{N}+1,n}+(1-\alpha)\ \boldsymbol{b}_{\mathcal{N},n}$.

At 112, the processing device may end the execution of operations to construct a fractional order beamformer for the DMA. For example, the processing device may generate a beamforming filter based on the generated fractional order beampattern as a final step in the construction of the beamformer. The beamforming filter $h(\omega)$ can be derived, for example, by using a minimum-norm method:

$$\min_{h(\omega)} h^H(\omega)h(\omega), \text{ subject to } \Psi(\omega)h(\omega)=\Upsilon^*(\theta_s)\ \boldsymbol{b}_{\mathcal{N}_\alpha},$$

whose solution may be:

$$h_{\mathcal{N}_\alpha}(\omega)=\Psi^H(\omega)[\Psi(\omega)\Psi^H(\omega)]^{-1}\ \Upsilon^*(\theta_s)\ \boldsymbol{b}_{\mathcal{N}_\alpha}.$$

as explained more fully below with respect to FIG. 4. The constructed beampattern $B[h(\omega), \theta]$ after applying the beamforming filter $h(\omega)$ should substantially match the target beampattern $B(b_N, \theta-\theta_s)$.

Determination of the Fractional Order with a Target DF Value

The value of the fractional order ($\mathcal{N}\alpha$), given a target DF value for the DMA, may be determined based on $\theta_s=0°$ since the value of $\theta_s$ has no effect on the DF. Therefore, a frequency-independent planar DF (on the plane of the M microphones of the DMA) of the Nα order beampattern is defined as:

$$\mathcal{D}_{N_\alpha} = \frac{\pi|\beta_{N_\alpha}(0)|^2}{\int_0^\pi |\beta_{N_\alpha}(0)|^2 d\theta},$$

which can be written as:

$$\mathcal{D}_{N_\alpha} = \frac{1}{B_{N_\alpha}^T b_{N_\alpha}} = \frac{1}{\sum_{n=-N}^{N} b_{N_\alpha,n}^2}.$$

Consequently, the frequency-independent DF of the Nth-order beampattern may be defined as:

$$\mathcal{D}_N = \frac{1}{\sum_{n=-N}^{N} b_{N,n}^2}, \text{ with } \mathcal{N} = 0, 1, \ldots, N.$$

Therefore the DF of the $\mathcal{N}_\alpha$ beampattern satisfies $\mathcal{D}_{\mathcal{N}} \leq \mathcal{D}_{N\alpha} \leq \mathcal{D}_{\mathcal{N}+1}$ so that with a specified DF value, $\mathcal{D}$, the integer portion of the desired order $\mathcal{N}_\alpha$, i.e., $\mathcal{N}$, is obtained as $$\mathcal{N} = \arg_{\mathcal{N}'}(\mathcal{D}_{\mathcal{N}'} \leq \mathcal{D} \leq \mathcal{D}_{\mathcal{N}'+1}).$$

Therefore $$\mathcal{D}_{N_\alpha} = \frac{1}{\mathcal{A}_N\alpha^2 + \beta_N\alpha + C_N},$$

where:

$$\mathcal{A}_N = \sum_{n=-N}^{N} (b_{N+1,n} - b_{N,n})^2,$$

$$\beta_N = 2\sum_{n=-N}^{N} b_{N,n}(b_{N+1,n} - b_{N,n}), \text{ and}$$

$$C_N = \sum_{n=-N}^{N} b_{N,n}^2.$$

and $b_{\mathcal{N}}$ are vectors of real coefficients that determine the beampatterns. Therefore, the solution of the fractional portion a is determined by the equation:

$$\frac{1}{\mathcal{A}_N\alpha^2 + \beta_N\alpha + C_N} = \mathcal{D},$$

which may be equivalently transformed into a quadratic equation and its solution is simply computed as:

$$\alpha = \frac{-\beta_N \pm \sqrt{\beta_N^2 - 4\mathcal{A}_N\left(C_N - \frac{1}{\mathcal{D}}\right)}}{2\mathcal{A}_N}.$$

The fractional parameter α may be determined as the solution in the range of [0, 1].

Figure 2:
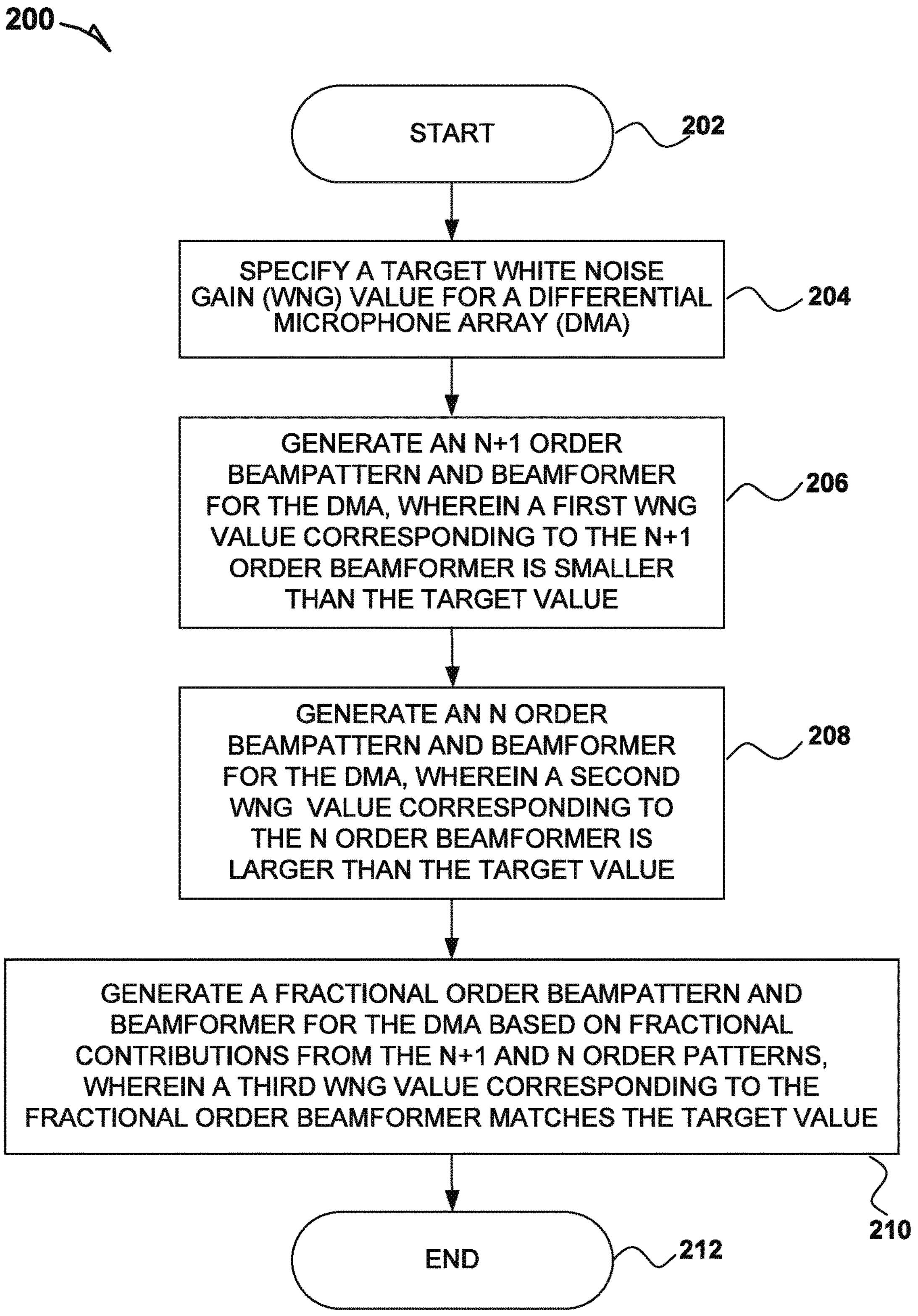
FIG. 2 is a flow diagram illustrating a method for constructing a beamformer with a fractional order beampattern based on a target white noise gain (WNG) for an FDMA, according to an implementation of the present disclosure.

In one implementation, a fractional order beampattern may be determined based on a target WNG value. FIG. 2 is a flow diagram illustrating a method 200 for constructing a beamformer with a fractional order beampattern based on a target WNG value for an FDMA, according to some implementations of the present disclosure. The method 200 may be performed by processing logic that comprises hardware (e.g., circuitry, dedicated logic, programmable logic, microcode, etc.), software (e.g., instructions run on a processing device to perform hardware simulation), or a combination thereof.

Referring to FIG. 2, at 202, the processing device may start executing operations to construct a beamformer for a DMA with M microphones flexibly distributed on a plane, e.g., FDMA 302 of FIG. 3. As noted above, with respect to FIG. 1, the center of the DMA may without limitation coincide with the origin of a two-dimensional coordinate system with the azimuthal angles being measured anti-clockwise from the x axis.

At 204, the processing device may specify a target WNG value for the DMA. As noted above, the WNG evaluates the sensitivity of a beamformer to some of the DMA's own imperfections (e.g., noise from its own hardware elements). The WNG associated with the DMA, as described above with respect to FIG. 1, may be written as:

$$\mathcal{W}[h(\omega)] = \frac{|h^H(\omega)d(\omega, \theta_s)|^2}{h^H(\omega)h(\omega)},$$

where $h(\omega)=[H_1(\omega)\ H_2(\omega) \ldots H_m(\omega)]^T$ is a global filter for a beamformer associated with the DMA, and the superscript H represents the conjugate-transpose operator, and $[H_1(\omega)\ H_1(\omega) \ldots H_M(\omega)]^T$ are the spatial filter of M microphones.

At 206, the processing device may generate an N order beampattern and corresponding N order beamformer for the DMA, wherein N is an integer and a first WNG value corresponding to the N order beamformer is smaller than the target WNG value. In this situation, the N order beampattern does not reach the target WNG value and therefore negatively affects the DF values more than is necessary, e.g., more spatial noise is present than is needed to achieve the target WNG value.

At 208, the processing device may generate an N−1 order beampattern and corresponding beamformer for the DMA, wherein a second WNG value corresponding to the N−1 order directivity beamformer is greater than the target WNG value. In this situation, the N−1 order exceeds the target WNG value and therefore more spatially white noise (e.g., noise from DMA microphones) is present than is desired based on the target WNG value.

At 210, the processing device may generate a fractional order beampattern and corresponding beamformer for the DMA, wherein a third WNG value corresponding to the fractional order beamformer matches the target WNG value and the fractional order beampattern comprises a first fractional contribution from the N order beampattern and a second fractional contribution from the N−1 order beampattern.

As noted above, with respect to FIG. 1, by properly choosing the value of the fractional order α, the compromise beampattern may achieve continuous performance compromises between the N and 0 Order beampatterns. Also as noted above, the fractional orders may be determined in a multi-stage way, i.e., first a compromise between the N+1 and N order beampatterns is established, then between N and (N−1) order, and so on until to the omnidirectional. To begin, a fractional (N+a) order beampattern (α∈[0, 1]) that achieves a compromise between the beampatterns of order N+1 and N may be determined.

At 212, the processing device may end the execution of operations to construct the fractional order beamformer for the DMA. As noted above with respect to FIG. 1, the processing device may generate a beamforming filter based on the generated fractional order beampattern as a final step in the construction of the fractional order beamformer. As noted above, the beamforming filter h(ω) can be derived by using a minimum-norm method as described more fully below with respect to FIG. 4:

$$\min_{h(\omega)} h^H(\omega)h(\omega), \text{ subject to } \Psi(\omega)h(\omega)=\Upsilon^*(\theta_s)\, b_{\mathcal{N}_\alpha},$$

whose solution may be defined as:

$$b_{\mathcal{N}_\alpha}(\omega)=\Psi^H(\omega)[\Psi(\omega)\Psi^H(\omega)]^{-1}\Upsilon^*(\theta_s)\, b_{\mathcal{N}_\alpha}.$$

The constructed beampattern B[h(ω), θ] after applying the beamforming filter h(ω) should match the target beampattern $B(b_N, \theta-\theta_s)$.

Determination of the Fractional Order ($\mathcal{N}_\alpha$) with a Target WNG Value for the DMA:

A white noise amplification problem (e.g., WNG) may greatly affect the performance of the DMA. Consequently, achieving a reasonable WNG level while also achieving a relatively high value of the DF with the DMA beamformer is a significant issue. As noted above, the WNG of the DMA may be defined as:

$$\mathcal{W}[h(\omega)] = \frac{|h^H(\omega)d(\omega, \theta_s)|^2}{h^H(\omega)h(\omega)},$$

which for the fractional ($N_\alpha$) order beampattern, can be written as:

$$b_{\mathcal{N}_\alpha}(\omega)\, h^H_{\mathcal{N}_\alpha}=\alpha^2 \chi_{\mathcal{N}+1}(\omega)+2\alpha(1-\alpha)\zeta_{\mathcal{N}}(\omega)+(1-\alpha)^2 \chi_{\mathcal{N}}(\omega),$$

where $$\chi_{\mathcal{N}+1}(\omega)=\tilde{b}^T_{\mathcal{N}+1}\Phi(\omega)\tilde{b}_{\mathcal{N}+1}=b^T_{\mathcal{N}+1}\Phi(\omega)\, b_{\mathcal{N}+1},$$

$$\zeta_{\mathcal{N}}(\omega)=\Re\{\tilde{b}^T_{\mathcal{N}+1}\Phi(\omega)\tilde{b}_{\mathcal{N}}\}, \text{ and}$$

$$\chi_{\mathcal{N}}(\omega)=\tilde{b}^T_{\mathcal{N}}\Phi(\omega)\tilde{b}_{\mathcal{N}}=b^T_{\mathcal{N}}\Phi(\omega)\, b_{\mathcal{N}},$$

with □(·) being the real part of a complex number and $b_{\mathcal{N}}$ being vectors of real coefficients that determine the beampatterns. Consequently, by neglecting the approximation error on the distortion-less constraint in the look direction, the WNG of the Nth-order beampattern may be defined as:

$$\mathcal{W}[h_{N_\alpha}(\omega)] \approx \frac{1}{\alpha^2\chi_{N+1}(\omega) + 2\alpha(1-\alpha)\zeta_N(\omega) + (1-\alpha)^2\chi_N(\omega)}.$$

Therefore the WNG of the $\mathcal{N}_\alpha$ beampattern, at a given frequency, satisfies $$\mathcal{W}[h_{N+1}(\omega)] = \frac{1}{\chi_{N+1}(\omega)} \le \mathcal{W}[h_{N+1}(\omega)] \le \frac{1}{\chi_N(\omega)} = \mathcal{W}[h_n(\omega)]$$

so that with a specified WNG value, $\mathcal{N}$, the integer portion of the desired order $\mathcal{N}_\alpha$, i.e., $\mathcal{N}$, is obtained as:

$$\mathcal{N} = \arg_{\mathcal{N}'}\{\mathcal{W}[h_{N+1}(\omega)] \le \mathcal{W} \le \mathcal{W}[h_N(\omega)]\}.$$

Then, the fractional portion a may be computed by setting $\mathcal{W}[h_{\mathcal{N}_\alpha}(\omega)]=\mathcal{W}$, which is equivalent to solving the following equation:

$$\mathcal{A}_N\alpha^2 + \beta_N\alpha + C_N = 0,$$

where:

$$\mathcal{A}_N = \chi_{N+1}(\omega) - 2\zeta_N(\omega) + \chi_N(\omega),$$

$$\beta_N = 2[\zeta_N(\omega) - \chi_N(\omega)], \text{ and}$$

$$C_N = \chi_N(\omega) - \frac{1}{\mathcal{W}}.$$

Therefore, the solution of the fractional portion a may be determined as:

$$\alpha = \frac{-\beta_N \pm \sqrt{\beta_N^2 - 4\mathcal{A}_N C_N}}{2\mathcal{A}_N}.$$

The fractional parameter α may be determined as the solution in the range of [0, 1]. Therefore, DMA beamformers may be constructed with a given minimum tolerant WNG, W, where W is a constant determined by a robustness level of the DMA system.

FIG. 3 shows a detailed arrangement of an FDMA and beamformer system 300 according to some implementations of the present disclosure. As shown in FIG. 3, system 300 may include the FDMA 302, an analog-to-digital converter (ADC) 304, and a processing device 306. As noted above. FDMA 302 may include flexibly distributed microphones ($m_0, m_1, \ldots, m_k, \ldots, m_M$) that are arranged on a common plenary platform. The locations of these microphones may be specified with respect to a coordinate system (x, y). The coordinate system may include an origin (O) to which the microphone locations may be specified. The coordinates of the microphones can be specified as:

$$r_k=r_k[\cos(\psi_k)\sin(\psi_k)]^T,$$

with k=1, 2, . . . , M, where the superscript T is the transpose operator, $r_k$ represents the distance from the $k^{th}$ microphone to the origin, and $\psi_k$ represents the angular position of the $k^{th}$ microphone. The distance between microphone i and microphone j is then $$\delta_{ij}=\|r_i-r_j\|,$$

where i, j=1, 2, . . . , M, and ||·|| is the Euclidean norm. It is assumed that the maximum distance between two microphones is smaller than the wavelength (λ) of the sound wave.

Assuming that the source signal is a plane wave from a far-field, propagating in an anechoic acoustic environment at the speed of the sound (c=340 m/s), and impinges on FDMA 302. The incident direction of the source signal to FDMA 302 is the azimuthal angle $\theta_s$. The time delay between the $k^{th}$ microphone and the reference point (O) can be written as:

$$\tau_k(\theta_s) = \frac{r_k}{c}\cos(\theta_s - \psi_k),$$

where k=1, 2, . . . , M.

FDMA 302 may be associated with a steering vector that may represent the relative phase shifts for the incident far-field waveform across the microphones of FDMA 302. Thus, the steering vector is the response of FDMA 302 to an impulse input. With the features of FDMA 302, as described above, a steering vector for FDMA 302 may be defined as:

$$d(\omega,\theta_s)=[e^{j\omega\tau_1(\theta_s)}e^{j\omega\tau_2(\theta_s)} \ldots e^{j\omega\tau_M(\theta_s)}]^T,$$

where the superscript T is the transpose operator, j is the imaginary unit with $j^2=-1$, $\omega=2\pi f$ is the angular frequency, and f>0 is the temporal frequency.

As noted above, the microphone sensors of FDMA 302 may receive acoustic signals originated from a sound source from an incident direction $\theta_s$. In one implementation, the acoustic signal may include a first component s(t) from the sound source and a second component v(t) of noise (e.g., additive noise), wherein t is the time. Each microphone of FDMA 302 may receive a version of an acoustic signal $a_k(t)$ that may include a delayed copy of the first component s(t) from the sound source, that is represented as $s(t+d_k)$, and a noise component represented as $v_k(t)$, wherein t is the time, k=1, . . . , M, $d_k$ is the time delay for the acoustic signal received at microphone $m_k$ to a reference point, and $v_k(t)$ represents the noise component at microphone $m_k$. The electronic circuit of microphone $m_k$ of FDMA 302 may convert $a_k(t)$ into electronic signals $e_k(t)$ that may be fed into the ADC 304, wherein k=1, . . . , M. In one implementation, the ADC 304 may further convert the electronic signals $e_k(t)$ into digital signals $y_k(t)$. The analog to digital conversion may include quantization of the input $e_k(t)$ into discrete values $y_k(t)$.

In one implementation, the processing device 306 may include an input interface (not shown) to receive the digital signals $y_k(t)$ and identify the sound source using fractional beamformer 310 obtained using implementations described above. To execute fractional beamformer 310, in one implementation, the processing device 306 may implement a pre-processor 308 that may further process the digital signal $y_k(t)$ for fractional beamformer 310. The pre-processor 308 may include hardware circuits and software programs to convert the digital signals $y_k(t)$ into frequency domain representations using such as, for example, short-time Fourier transforms (e.g., STFT 404 as shown in FIG. 4) or any suitable type of frequency transformations. The STFT may calculate the Fourier transform of its input signal over a series of time frames. Thus, the digital signals $y_k(t)$ may be processed over the series of time frames.

Figure 4:
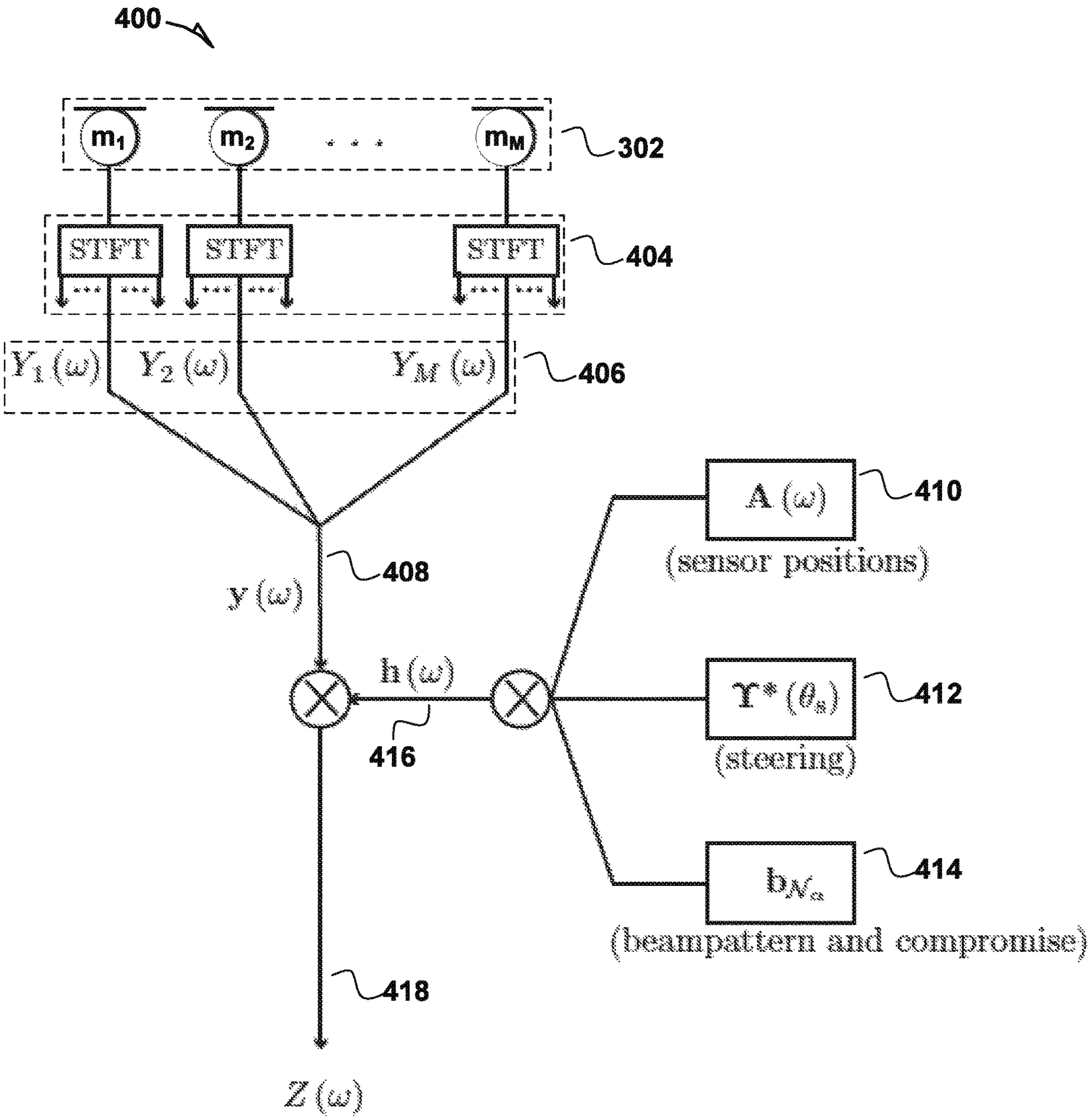
FIG. 4 is a data flow diagram illustrating a data flow of an FDMA and beamformer system according to an implementation of the present disclosure.

In one implementation, the pre-processing module 308 may perform STFT on the input $y_k(t)$ associated with microphone $m_k$ of FDMA 302 and calculate the corresponding frequency domain representation (e.g., $Y_k(w)$ 406, as shown in FIG. 4). In one implementation, fractional beamformer 310 may receive frequency representations $Y_k(\omega)$ 406 of the digital signals $y_k(t)$ and calculate an estimate (e.g., Z(ω) 418, as shown in FIG. 4) in the frequency domain for the first component (s(t)) from the sound source. The frequency domain may be divided into a number (L) of frequency sub-bands, and the fractional beamformer 310 may calculate the estimate (e.g., Z(ω)) 418 for each frequency sub-band.

The processing device 306 may also include a post-processor 312 that may convert the estimate Z(ω) 418 for each of the frequency sub-bands back into the time domain to provide the estimate sound source represented as x(t). The estimated sound source x(t) may be determined with respect to the source signal received at a reference point (e.g., a microphone sensor location) in FDMA 302.

FIG. 4 is a data flow diagram illustrating a data flow of a flexible differential microphone array (FDMA) and beamformer system 400 according to an implementation of the present disclosure. As shown in FIG. 4, system 400 may include the FDMA 302 (as described above with respect to FIG. 3) and a beamforming filter h(ω) 416. FDMA 302 may include a number M of flexibly distributed microphones ($m_1$, $m_2$, . . . $m_k$, . . . , $m_M$) that are arranged on a common plenary platform. These microphones may be located at any locations on the plenary platform, e.g., the location is flexible. The locations of these microphones may be specified with respect to a coordinate system (x, y), as explained more fully above with respect to FIG. 3.

In one implementation, the data received from the M microphones of FDMA 302 may be pre-processed using short-time Fourier transforms (STFT) 404 on a time domain input $y_k(t)$ (as shown in FIG. 3) associated with each microphone $m_k$ of FDMA 302 in order to calculate a corresponding frequency domain representation $Y_1(\omega)$ 406, wherein (t) is the time of the input, ω (ω=2πf) represents the angular frequency domain and k=1, . . . , M. In one implementation, beamforming filter h(ω) 416 may receive frequency representations $Y_k(\omega)$ (as y(ω) 408) and calculate an estimate Z(ω) 418 in the frequency domain for a first component s(t) from the sound source.

The beamforming filter h(ω) 416 may be determined so that its beampattern is as close as possible to a desired frequency-invariant beampattern (as described above with respect to step 106 of method 100 of FIG. 1). To achieve this objective, the exponential function that appears in a beamformer's beampattern, B[h(ω), θ], may be approximated using an $N^{th}$ order Jacobi-Anger expansion:

$$e^{jx_m\cos(\theta-\psi_m)} = \sum_{n=-\infty}^{\infty} j^n J_n(x_m)e^{jn(\theta-\psi_m)},$$

where $J_n(x)$ is the nth-order Bessel function of the first kind. Using the above Jacobi-Anger expansion, and limiting the Jacobi-Anger series to the order ±N (since the maximum designable order may be determined as N based on the number M of microphones of the FDMA 302), it is show the beampattern for the beamformer may be written as:

$$B_N[h(\omega), \theta] = \sum_{n=-N}^{N} e^{jn\theta} j^n \psi_n^T(\omega)h^*(\omega),$$

where $\psi_n(\omega)=[J_n(x_1)e^{-jn\psi_1}\ J_n(x_2)e^{-jn\psi_2} \ldots J_n(x_M)e^{-jn\psi_M}]^T$, with n=0, ±1, ±2, . . . , ±N, is a vector of length M. Based on the representation of Jacobi-Anger expansion, it follows that $$\Psi(\omega)h(\omega) = \Upsilon^*(\theta_s)b_N,$$

where

-continued $$\Psi(\omega)=\begin{bmatrix}(-j)^N\psi_{-N}^H(\omega)\\ \vdots\\ \vdots\\ \Psi_0^H(\omega)\\ \vdots\\ \vdots\\ (-j)^N\psi_N^H(\omega)\end{bmatrix}$$

is a (2N+1)×M matrix and the superscript * denotes complex conjugation. Therefore, the beamforming filter h(ω) can be derived, for example, by using a minimum-norm method:

$$\min_{h(\omega)} h^H(\omega)h(\omega),\ \text{subject to } \Psi(\omega)h(\omega)=\Upsilon^*(\theta_s)\,\boldsymbol{b}_{\mathcal{N}_\alpha},$$

whose solution may be determined as:

$$h_{\mathcal{N}_\alpha}(\omega)=\Psi^H(\omega)[\Psi(\omega)\Psi^H(\omega)]^{-1}\,\Upsilon(\theta_s)\,\boldsymbol{b}_{\mathcal{N}_\alpha},$$

As shown in FIG. 4, the beamforming filter h(ω) 416 may include three parts (the specifies of which have been discussed above): A(ω) which depends on the positions of the M microphones of FDMA 302 (where $A(\omega)=\Psi^{-1}(\omega)$ for M=2N+1, $A(\omega)=\Psi^H(\omega)\,[\Psi(\omega)\Psi^H(\omega)]^{-1}$ for M>2N+1, N is the order of FDMA 302, Ψ is an angular position of a microphone and the superscript H represents the conjugate-transpose operator), Υ*(θs) controls the steering of the beampattern (where θ is the incident angle of the sound source), and $b_{N_\alpha}$ determines the shape of the beampattern and the compromise between the performance (e.g., DF vs. WNG) of successive integer order beampatterns (where $\mathcal{N}$ =0, 1, . . . , N and α is real number in [0, 1] range).

As seen in the data flow of system 400, the three parts of beamforming filter h(ω) 416 operate independently of each other, so that an adjustment of the microphone positions, the steering of the beampattern or the controlling of the order of the beampattern (and its fractional order compromise) may be implemented separately without concern for the other parts. Accordingly, the methodologies for generating fractional order beampatterns (and constructing corresponding fractional order beamformers) described herein may easily be applied to existing differential microphone array systems in order to increase robustness, without sacrificing DF unnecessarily, by lowering the order of the system to the next lower integer value.

Figure 5A:
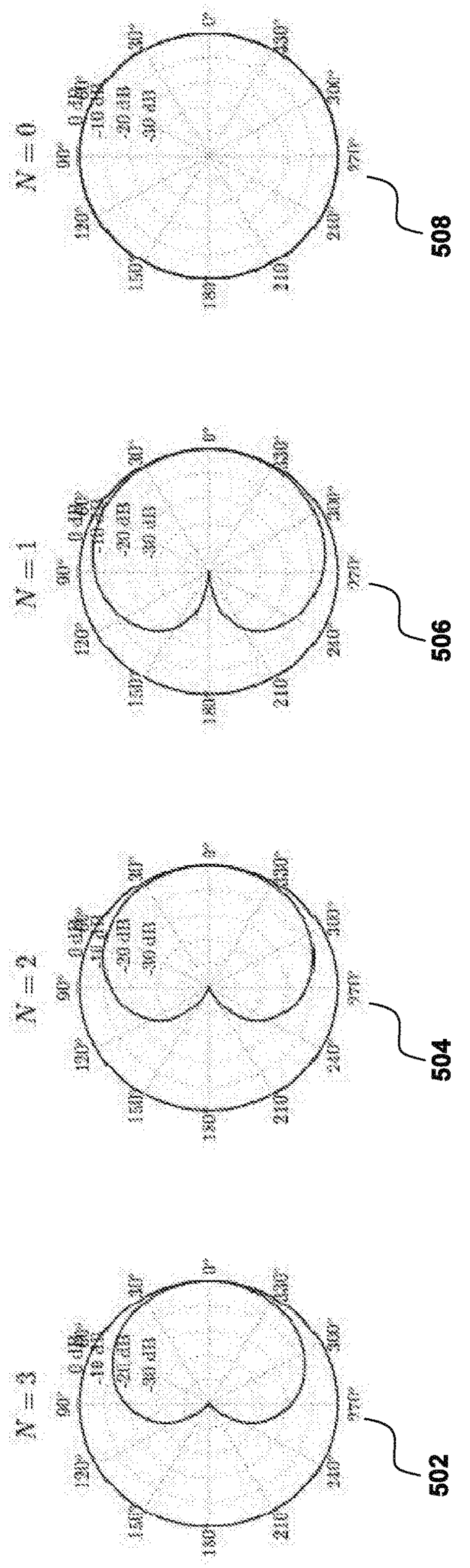
FIGS. 5A-5C show beampatterns of integer order and graphs of their corresponding DF and WNG values as a function of frequency, according an implementation of the present disclosure.
Figure 5B:
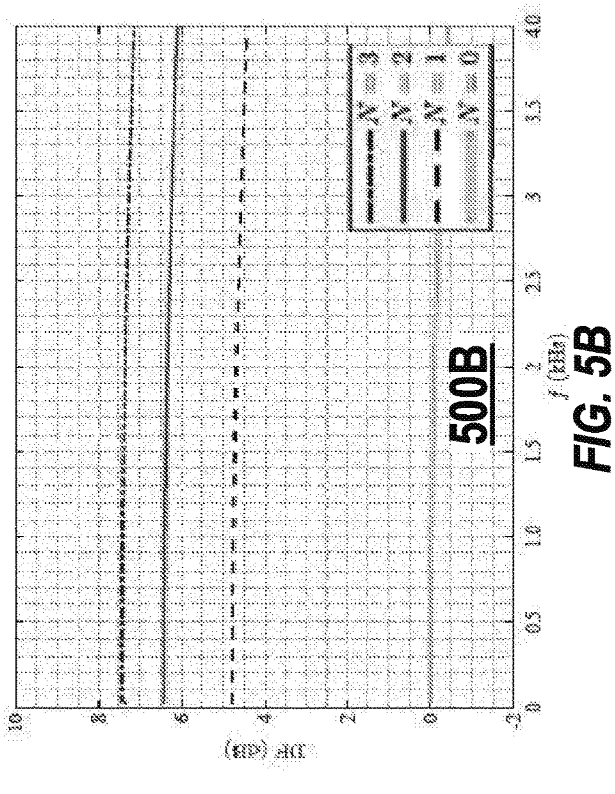
Figure 5C:
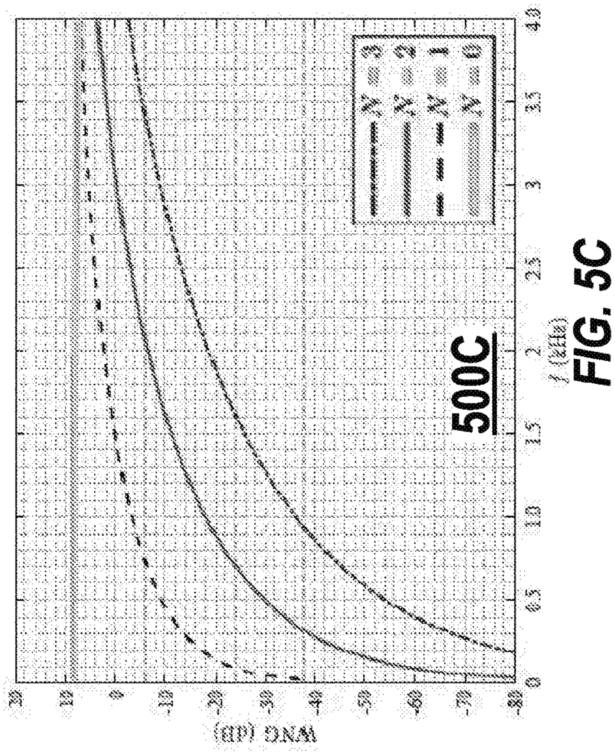

FIGS. 5A-5C show beampatterns (502, 504, 506 and 508) of integer order and graphs (500B and 500C) of their corresponding DF and WNG values as a function of frequency, according some implementations of the present disclosure. The desired frequency-independent beampattern, for a DMA, may be chosen with a unique null of maximum multiplicity in the direction opposite to the look direction:

$$B(\theta-\theta_s)=\frac{1}{2^N}2^N[1-\cos(\theta-\theta_s)]^N.$$

The advantage of this kind of beampattern is that there are no side lobes, so it is desired in many practical applications where interference is mainly located in the back part of the desired direction (e.g., the look direction). For the above-noted, desired frequency-independent beampattern, the corresponding coefficients $b_N$ that determine the shape of the different order beampatterns are given in Table 1 below.

TABLE 1

| N | $b_N$ |
|---|---|
| 1 | $\left[\frac{1}{4}\,\frac{1}{2}\,\frac{1}{4}\right]^T$ |
| 2 | $\left[\frac{1}{16}\,\frac{1}{4}\,\frac{3}{8}\,\frac{1}{4}\,\frac{1}{16}\right]^T$ |
| 3 | $\left[\frac{1}{64}\,\frac{3}{32}\,\frac{15}{64}\,\frac{5}{16}\,\frac{15}{64}\,\frac{3}{32}\,\frac{1}{64}\right]^T$ |

The beampatterns (502, 504, 506 and 508) and graphs (500B and 500C) of their corresponding DF and WNG values as a function of frequency are associated with a standard integer-order (e.g., 0, 1, 2, 3) uniform circular array consisting of seven microphones, with a radius of 1.0 cm. In this case (e.g., M=7), the maximum designable order of the DMA is N=3 so that M=2N+1. Without loss of generality, it is assumed that the desired look direction is 0□, i.e., $\theta_s$=0□. FIG. 5A shows the beampatterns (502, 504, 506 and 508) for the 3rd, 2nd, 1st, and 0th order beampatterns of the circular DMA for f=500 Hz. It is clear that the beampatterns (502, 504, 506 and 508) have a unique null at 180□ (except 0th-order 508) and are symmetric with respect to the look direction 0□.

As shown in FIGS. 5B and 5C, the graphs 500B and 500C map the corresponding DF and WNG values, as a function of frequency f (kHz), of the 3rd, 2nd, 1st, and 0th order beampatterns (502, 504, 506 and 508), respectively. As can be seen in the graphs 500B and 500C, the higher order beamformer (e.g., 3rd order) has a very small value of WNG at low frequencies, indicating that this beamformer significantly amplifies white noise. Therefore, it is clear that, for fixed number of microphones (e.g., M=7), the WNG can only be improved by reducing the integer-order of the circular DMA. However, this order reduction causes a flatter beampattern and a much lower DF for the circular DMA. For instance, if the circular DMA system has a minimum tolerant WNG requirement of −20 dB (e.g., robustness requirement) then, as seen from FIGS. 5A-5C, only a first order circular DMA below 800 Hz and second order circular DMA between 800 Hz and 2300 Hz may be achieved.

Figure 6A:
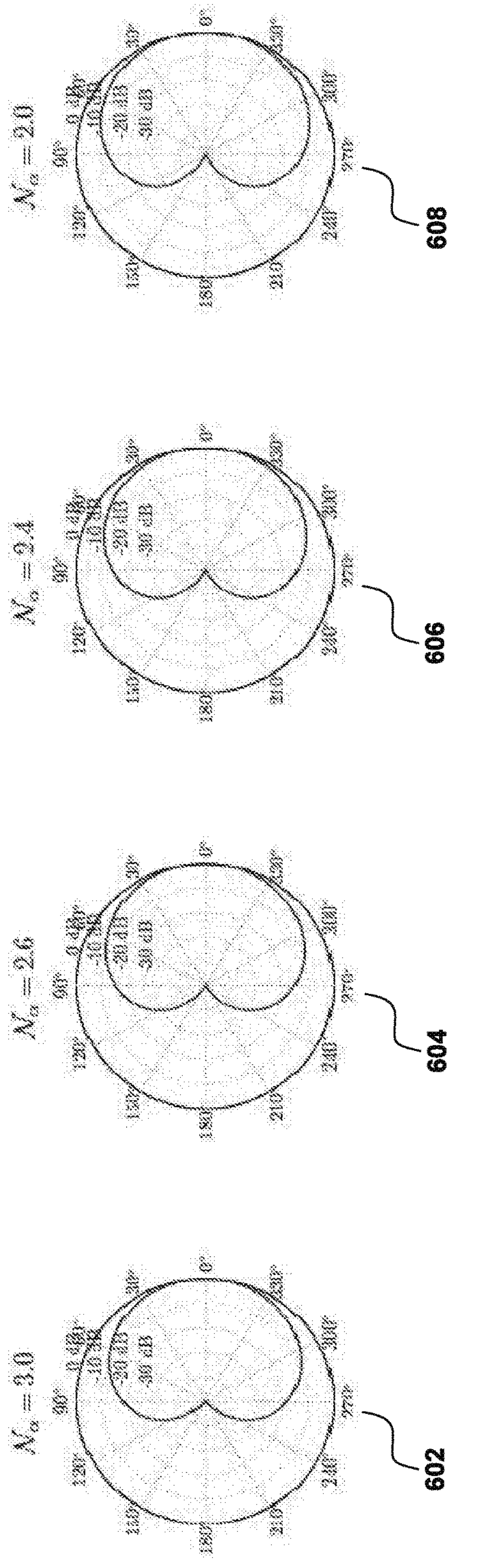
FIGS. 6A-6C show beampatterns of integer and fractional order, and graphs of their corresponding DF and WNG values as a function of frequency, according an implementation of the present disclosure.
Figure 6B:
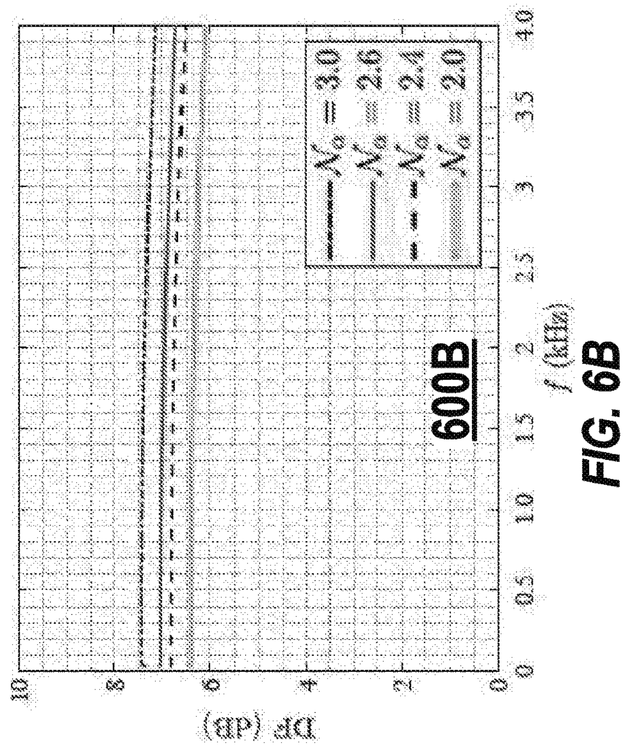
Figure 6C:
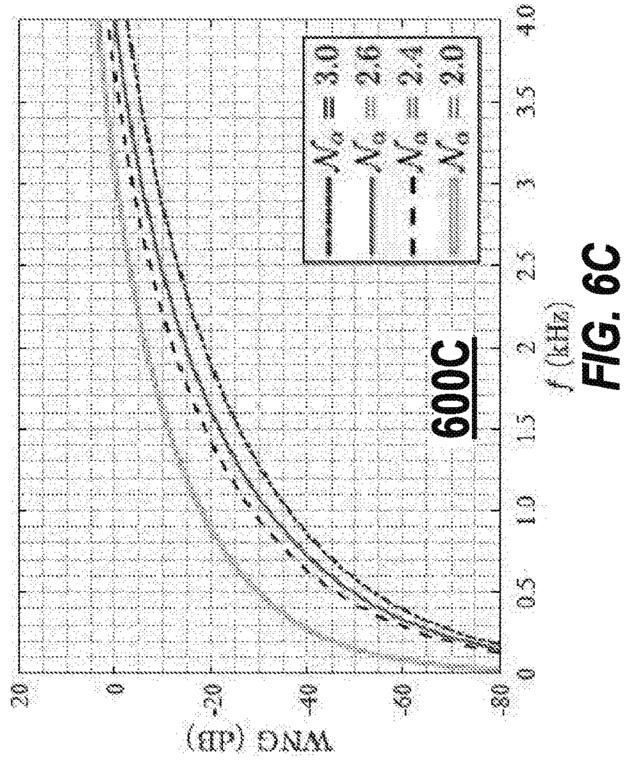

FIGS. 6A-6C show beampatterns (602, 604, 606 and 608) of integer and fractional order and graphs (600B and 600C) of their corresponding DF and WNG values as a function of frequency, according some implementations of the present disclosure.

The beampatterns (602, 604, 606 and 608) and graphs (600B and 600C) of their corresponding DF and WNG values as a function of frequency are associated with a fractional order $N_\alpha \in \{3.0, 2.6, 2.4, 2.0\}$ uniform circular array may include seven microphones, with a radius of 1.0 cm. As with FIGS. 5A-5C (e.g., M=7), the maximum designable order of the DMA is N=3 so that M=2N+1 and it is assumed that the desired look direction is 0□, i.e., $\theta_s$=0□. FIG. 6A shows the beampatterns (602, 604, 606 and 608) for the 3rd, 2.6th, 2.4th, and 2nd order beampatterns of the circular DMA for f=500 Hz. It is clear that the beampatterns (602, 604, 606 and 608) have a unique null at 180□ and are symmetric with respect to the look direction 0□.

As shown in FIGS. 6B and 6C, the graphs 600B and 600C map the corresponding DF and WNG values, as a function of frequency f (kHz), of the 3rd, 2.6th, 2.4th, and 2nd order beampatterns (502, 504, 506 and 508), respectively. As can be seen in the graphs 600B and 600C, the fractional order beamformer can achieve a good compromise between the performance of the 3rd-order and that of the 2nd order beamformer for the circular DMA. Therefore, with a target WNG of −20 dB as in FIGS. 5A-5C, the proper values of fractional order $N_\alpha$ to meet the requirements for each frequency can be determined, respectively. Therefore, it is clear that, for fixed number of microphones (e.g., M=7), the WNG can now be improved by reducing the fractional-order of the circular DMA so that DF is not lost unnecessarily after the WNG target has already been met. This fractional-order reduction, however, does not cause excess flattening of the beampattern and lowers the DF for the circular DMA only as much as necessary to achieve the target WNG value.

Therefore, it is possible to design robust fractional order DMAs with a known minimum tolerant WNG value, $W_0$ wherein $W_0$ is assumed as a constant determined by the robustness level of the system. As discussed, with seven microphones, the maximum designable order of the DMA is third-order, i.e., N=3. So, for each frequency, if the third-order DMAs has already satisfied the minimum tolerant WNG, the third-order DMAs can be designed directly. Otherwise, implementations may include a processing device that may first determine the fractional order $N_\alpha$ and then design the corresponding fractional order DMA. The robust DMA beamformer can satisfy the desired robustness level over the frequency band of interest by sacrificing some directivity, i.e., obtaining a tradeoff in performance between a high value of the DF and a good robustness.

Figure 7A:
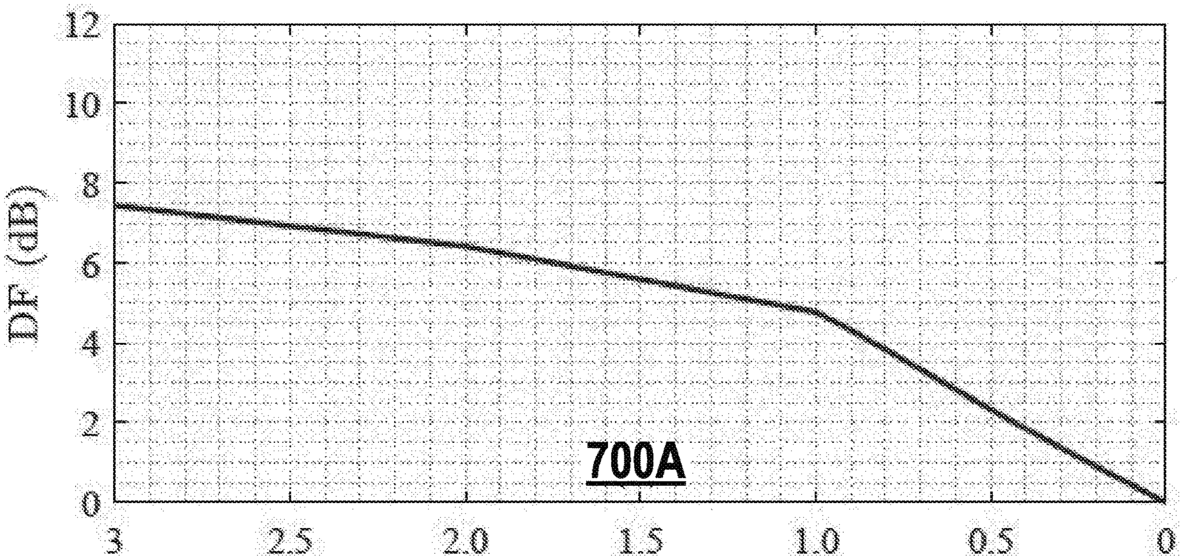
FIGS. 7A-7B show graphs of DF and WNG values as a function of the fractional order, according to an implementation of the disclosure.
Figure 7B:
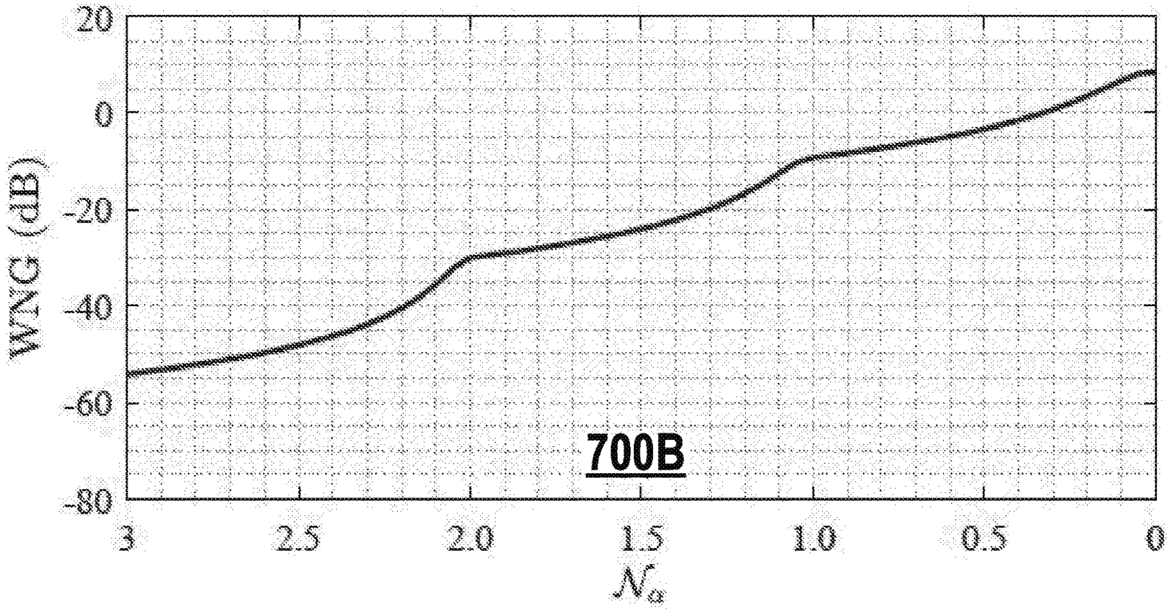

FIGS. 7A-7B show graphs (700A and 700B) of DF and WNG values as a function of the fractional order, according to some implementations of the disclosure. In order to more clearly see the influence of the fractional order $N_\alpha$ on the beamforming performance, graphs 700A and 700B plot the DF and the WNG of the circular DMA of FIGS. 6A-6C, as a continuous function of the fractional order $N_\alpha$ from 3rd order to 0th order. The experimental conditions are the same as in FIGS. 6A-6C, so M=7, the maximum designable order of the DMA is N=3 such that M=2N+1, it is assumed that the desired look direction is 0□, i.e., $\theta_s$=0□, and the frequency f=500 Hz.

As seen in graphs 700A and 700B, the DF decreases with the fractional order $N_\alpha$ and the WNG increases with the fractional order $N_\alpha$ thus achieving a continuous compromise in performance between the orders of N and 0 for the circular DMA. Therefore, a value of $N_\alpha$ (chosen for the design the circular DMA) controls a performance compromise between large values of the DF and white noise amplification.

Circular DMAs (CDMA) and Linear DMAs (LDMA) with Fractional Order:

The CDMAs may be designed with the M microphones that are distributed as a uniform circular array, which is equivalent to $$\psi_m = (m-1)\frac{2\pi}{M},$$

$r_m$=r, m=1, 2, . . . , M, wherein $r_m$ represents the distance (e.g., radius) from the $m^{th}$ microphone to the origin, and $\psi_m$ represents the angular position of the $m^{th}$ microphone. Therefore, based on the analysis described above with respect to FIG. 4, the beamforming filter for the CDMA may be defined as:

$$h_{N_\alpha}(\omega) = \frac{1}{M}\Psi^H(\omega)J^{-1}(x)\Upsilon^*(\theta_s)b_{N_\alpha}.$$

The LDMAs may be designed with the M microphones that are distributed as a uniform linear array, which is equivalent to $\psi_m=\pi$, m=1, 2, . . . , M and $r_m=(m-1)r_0$, wherein $r_m$ represents the distance from the $m^{th}$ microphone to the origin, and $\psi_m$ represents the angular position of the $m^{th}$ microphone. Therefore, based on the analysis described above with respect to FIG. 4, the beamforming filter for the LDMA may be defined as:

$$h_{N_\alpha}(\omega)=\Psi^H(\omega)[\Psi(\omega)\Psi^H(\omega)]^{-1}\bar{b}_{N_\alpha}$$

since electronic steering is not possible for an LDMA so that the steering matrix $\Upsilon^*(\theta_s)$ is not needed for the beamforming filter's determination.

Figure 8:
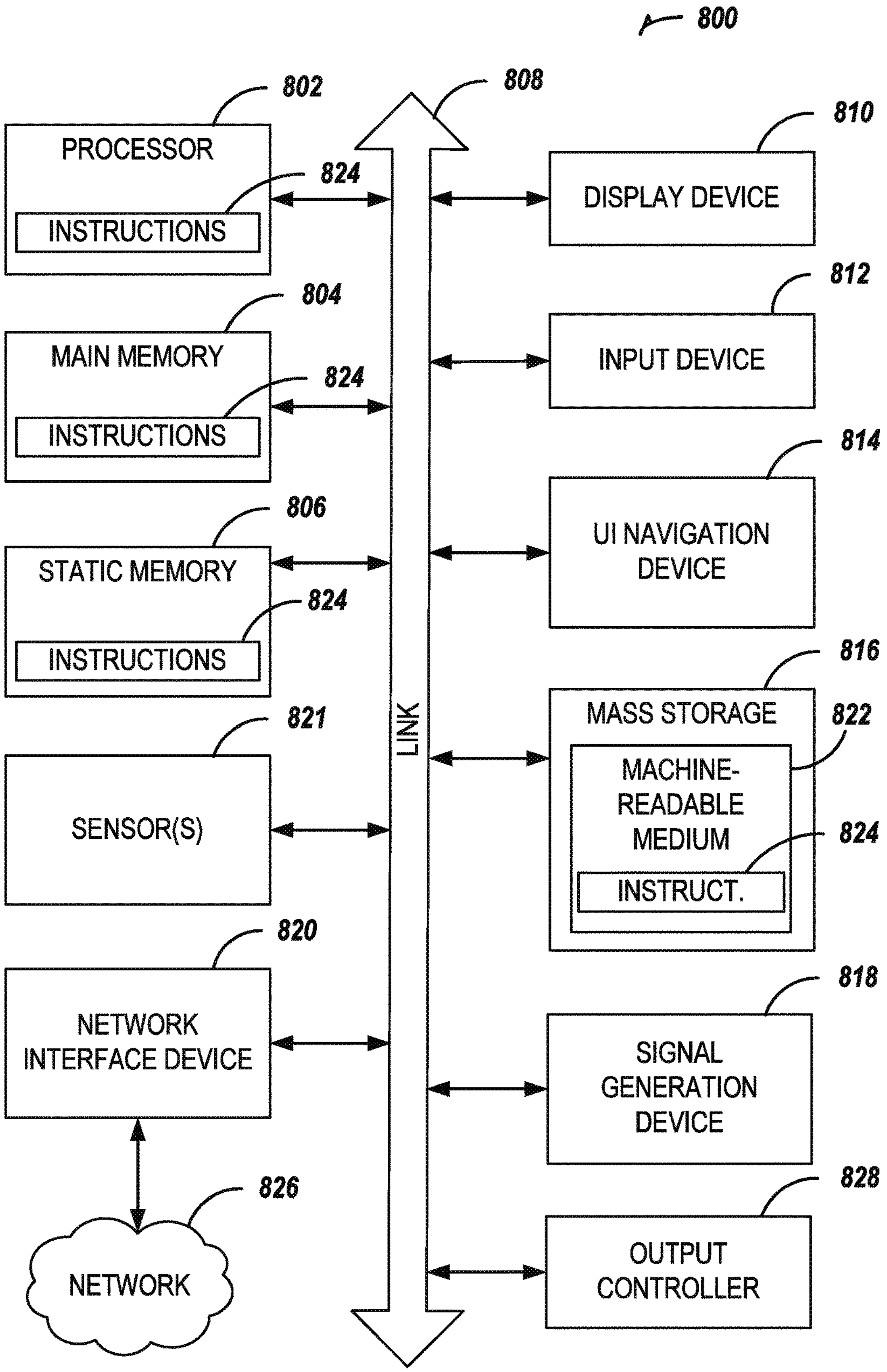
FIG. 8 is a block diagram illustrating an exemplary computer system, according to an implementation of the present disclosure.

FIG. 8 is a block diagram illustrating a machine in the example form of a computer system 800, within which a set or sequence of instructions may be executed to cause the machine to perform any one of the methodologies discussed herein, according to an example embodiment. In alternative embodiments, the machine operates as a standalone device or may be connected (e.g., networked) to other machines. In a networked deployment, the machine may operate in the capacity of either a server or a client machine in server-client network environments, or it may act as a peer machine in peer-to-peer (or distributed) network environments. The machine may be an onboard vehicle system, wearable device, personal computer (PC), a tablet PC, a hybrid tablet, a personal digital assistant (PDA), a mobile telephone, or any machine capable of executing instructions (sequential or otherwise) that specify actions to be taken by that machine. Further, while only a single machine is illustrated, the term "machine" shall also be taken to include any collection of machines that individually or jointly execute a set (or multiple sets) of instructions to perform any one or more of the methodologies discussed herein. Similarly, the term "processor-based system" shall be taken to include any set of one or more machines that are controlled by or operated by a processor (e.g., a computer) to individually or jointly execute instructions to perform any one or more of the methodologies discussed herein.

Example computer system 800 includes at least one processor 802 (e.g., a central processing unit (CPU), a graphics processing unit (GPU) or both, processor cores, compute nodes, etc.), a main memory 804 and a static memory 806, which communicate with each other via a link 808 (e.g., bus). The computer system 800 may further include a video display unit 810, an alphanumeric input device 812 (e.g., a keyboard), and a user interface (UI) navigation device 814 (e.g., a mouse). In one embodiment, the video display unit 810, input device 812 and UI navigation device 814 are incorporated into a touch screen display. The computer system 800 may additionally include a storage device 816 (e.g., a drive unit), a signal generation device 818 (e.g., a speaker), a network interface device 820, and one or more sensors (not shown), such as a global positioning system (GPS) sensor, compass, accelerometer, gyrometer, magnetometer, or other sensor.

The storage device 816 includes a machine-readable medium 822 on which is stored one or more sets of data structures and instructions 824 (e.g., software) embodying or utilized by any one or more of the methodologies or functions described herein. The instructions 824 may also reside, completely or at least partially, within the main memory 804, static memory 806, and/or within the processor 802 during execution thereof by the computer system 800, with the main memory 804, static memory 806, and the processor 802 also constituting machine-readable media.

While the machine-readable medium 822 is illustrated in an example embodiment to be a single medium, the term "machine-readable medium" may include a single medium or multiple media (e.g., a centralized or distributed database, and/or associated caches and servers) that store the one or more instructions 824. The term "machine-readable medium" shall also be taken to include any tangible medium that is capable of storing, encoding or carrying instructions for execution by the machine and that cause the machine to perform any one or more of the methodologies of the present disclosure or that is capable of storing, encoding or carrying data structures utilized by or associated with such instructions. The term "machine-readable medium" shall accordingly be taken to include, but not be limited to, solid-state memories, and optical and magnetic media. Specific examples of machine-readable media include volatile or non-volatile memory, including but not limited to, by way of example, semiconductor memory devices (e.g., electrically programmable read-only memory (EPROM), electrically erasable programmable read-only memory (EEPROM)) and flash memory devices; magnetic disks such as internal hard disks and removable disks; magneto-optical disks; and CD-ROM and DVD-ROM disks.

The instructions 824 may further be transmitted or received over a communications network 826 using a transmission medium via the network interface device 820 utilizing any one of a number of well-known transfer protocols (e.g., HTTP). Examples of communication networks include a local area network (LAN), a wide area network (WAN), the Internet, mobile telephone networks, plain old telephone (POTS) networks, and wireless data networks (e.g., Wi-Fi, 3G, and 4G LTE/LTE-A or WiMAX networks). The term "transmission medium" shall be taken to include any intangible medium that is capable of storing, encoding, or carrying instructions for execution by the machine, and includes digital or analog communications signals or other intangible medium to facilitate communication of such software.

Language: In the foregoing description, numerous details are set forth. It will be apparent, however, to one of ordinary skill in the art having the benefit of this disclosure, that the present disclosure may be practiced without these specific details. In some instances, well-known structures and devices are shown in block diagram form, rather than in detail, in order to avoid obscuring the present disclosure.

Some portions of the detailed description have been presented in terms of algorithms and symbolic representations of operations on data bits within a computer memory. These algorithmic descriptions and representations are the means used by those skilled in the data processing arts to most effectively convey the substance of their work to others skilled in the art. An algorithm is here, and generally, conceived to be a self-consistent sequence of steps leading to a desired result. The steps are those requiring physical manipulations of physical quantities. Usually, though not necessarily, these quantities take the form of electrical or magnetic signals capable of being stored, transferred, combined, compared, and otherwise manipulated. It has proven convenient at times, principally for reasons of common usage, to refer to these signals as bits, values, elements, symbols, characters, terms, numbers, or the like.

It should be borne in mind, however, that all of these and similar terms are to be associated with the appropriate physical quantities and are merely convenient labels applied to these quantities. Unless specifically stated otherwise as apparent from the following discussion, it is appreciated that throughout the description, discussions utilizing terms such as "segmenting", "analyzing", "determining", "enabling", "identifying," "modifying" or the like, refer to the actions and processes of a computer system, or similar electronic computing device, that manipulates and transforms data represented as physical (e.g., electronic) quantities within the computer system's registers and memories into other data represented as physical quantities within the computer system memories or other such information storage, transmission or display devices.

The words "example" or "exemplary" are used herein to mean serving as an example, instance, or illustration. Any aspect or design described herein as "example' or "exemplary" is not necessarily to be construed as preferred or advantageous over other aspects or designs. Rather, use of the words "example" or "exemplary" is intended to present concepts in a concrete fashion. As used in this application, the term "or" is intended to mean an inclusive "or" rather than an exclusive "or". That is, unless specified otherwise, or clear from context, "X includes A or B" is intended to mean any of the natural inclusive permutations. That is, if X includes A; X includes B; or X includes both A and B, then "X includes A or B" is satisfied under any of the foregoing instances. In addition, the articles "a" and "an" as used in this application and the appended claims should generally be construed to mean "one or more" unless specified otherwise or clear from context to be directed to a singular form. Moreover, use of the term "an embodiment" or "one embodiment" or "an implementation" or "one implementation" throughout is not intended to mean the same embodiment or implementation unless described as such.

Reference throughout this specification to "one implementation" or "an implementation" means that a particular feature, structure, or characteristic described in connection with the implementation is included in at least one implementation. Thus, the appearances of the phrase "in one implementation" or "in an implementation" in various places throughout this specification are not necessarily all referring to the same implementation. In addition, the term "or" is intended to mean an inclusive "or" rather than an exclusive "or."

It is to be understood that the above description is intended to be illustrative, and not restrictive. Many other implementations will be apparent to those of skill in the art upon reading and understanding the above description. The scope of the disclosure should, therefore, be determined with reference to the appended claims, along with the full scope of equivalents to which such claims are entitled.

The invention claimed is:

1. A method for constructing a beamformer, for a differential microphone array (DMA) including a number M of microphones, the method comprising:

specifying, by a processing device, a target directivity factor (DF) value of a beampattern for the DMA;

generating, by the processing device, an N order beampattern for the DMA, wherein N is an integer and a first DF value corresponding to the N order beampattern is greater than the target DF value;

generating, by the processing device, an N−1 order beampattern for the DMA, wherein a second DF value corresponding to the N−1 order beampattern is smaller than the target DF value; and generating, by the processing device, a fractional order beampattern for the DMA, wherein a third DF value corresponding to the fractional order beampattern matches the target DF value and the fractional order beampattern comprises a first fractional contribution from the N order beampattern and a second fractional contribution from the N−1 order beampattern.

2. The method of claim 1, wherein the first, second and third DF values represent the ability of corresponding N, N−1 and fractional order beamformers to suppress spatial noise from directions other than a specified look direction.

3. The method of claim 1, wherein the N, N−1 and fractional order beampatterns reflect a sensitivity of corresponding N, N−1 and fractional order beamformers to a plane wave impinging on the DMA from a direction θ.

4. The method of claim 1, further comprising:

determining a value of the fractional order as (N−1+α), wherein α is a real number between 0 and 1, α*(N order beampattern) corresponds to the first fractional contribution and (1−α)*(N−1 order beampattern) corresponds to the second fractional contribution.

5. The method of claim 4, wherein N is a maximum designable order of the beamformer based on the number M of microphones, the method further comprising:

receiving a plurality of electronic signals generated by the M microphones responsive to a sound source;

determining that a first estimate of the sound source, based on the signals, by the N order beamformer includes more than a threshold amount of noise;

executing the (N−1+α) fractional order beamformer to calculate a second estimate of the sound source based on the signals, wherein α is a largest value for which the second estimate includes less than the threshold amount of noise.

6. The method of claim 1, wherein the M microphones of the DMA are arranged as one of a linear array or a circular array.

7. The method of claim 1, further comprising:

generating a beamformer filter based on the fractional order beampattern, wherein M>2*N+1.

8. A method for constructing a fractional order beamformer, for a differential microphone array (DMA) including a number M of microphones, the method comprising:

specifying, by a processing device, a target white noise gain (WNG) value for the DMA;

generating, by the processing device, an N+1 order beampattern and N+1 order beamformer for the DMA, wherein N is an integer value and a first WNG value corresponding to the N+1 order beamformer is smaller than the target WNG value;

generating, by the processing device, an N order beampattern and N order beamformer for the DMA, wherein a second WNG value corresponding to the N order beamformer is greater than the target WNG value; and generating, by the processing device, a fractional order beampattern and the fractional order beamformer for the DMA, wherein a third WNG value corresponding to the fractional order beamformer matches the target WNG value and the fractional order beampattern comprises a first fractional contribution from the N+1 order beampattern and a second fractional contribution from the N order beampattern.

9. The method of claim 8, wherein the first, second and third WNG values reflect a sensitivity of the corresponding N, N−1 and fractional order beamformers to self-noise from the M microphones of the DMA in a specified frequency range.

10. A system comprising:

a data store; and a processing device, communicatively coupled to the data store and to a number M of microphones of a differential microphone array (DMA), to:

specify a target directivity factor (DF) value for the DMA;

generate an N order beampattern for the DMA, wherein N is an integer and a first DF value corresponding to the N order beampattern is greater than the target DF value;

generate an N−1 order beampattern for the DMA, wherein a second DF value corresponding to the N−1 order beampattern is smaller than the target DF value; and generate a fractional order beampattern for the DMA, wherein a third DF value corresponding to the fractional order beampattern matches the target DF value and the fractional order beampattern comprises a first fractional contribution from the N order beampattern and a second fractional contribution from the N−1 order beampattern.

11. The system of claim 10, wherein the processing device generates a beamformer filter based on the fractional order beampattern, wherein M>2*N+1.

12. The system of claim 10, wherein the M microphones of the DMA are arranged as one of a linear array or a circular array.

13. A differential microphone array (DMA) comprising:

a number M of microphones located on a substantially planar platform;

a processing device, communicatively coupled to the M microphones, to:

specify a target directivity factor (DF) value for the DMA;

generate an N order beampattern for the DMA, wherein N is an integer and a first DF value corresponding to the N order beampattern is greater than the target DF value;

generate an N−1 order beampattern for the DMA, wherein a second DF value corresponding to the N−1 order beampattern is smaller than the target DF value; and generate a fractional order beampattern for the DMA, wherein a third DF value corresponding to the fractional order beampattern matches the target DF value and the fractional order beampattern comprises a first fractional contribution from the N order beampattern and a second fractional contribution from the N−1 order beampattern.

14. The differential microphone array of claim 13, wherein the processing device:

determines a value of the fractional order as (N−1+α), wherein α is a real number between 0 and 1, α*(N order beampattern) corresponds to the first fractional contribution and (1−α)*(N−1 order beampattern) corresponds to the second fractional contribution.

15. The differential microphone array of claim 13, wherein N is a maximum designable order of a beamformer based on the number M of microphones and the processing device:

receives a plurality of electronic signals generated by the M microphones responsive to a sound source;

determines that a first estimate of the sound source, based on the signals, by an N order beamformer includes more than a threshold amount of noise;

executes an (N−1+α) fractional order beamformer to calculate a second estimate of the sound source based on the signals, wherein $\alpha$ is a largest value for which the second estimate includes less than the threshold amount of noise.

16. The differential microphone array of claim 13, wherein the M microphones of the DMA are arranged as one of a linear array or a circular array.

17. The differential microphone array of claim 13, wherein the processing device:

generates a beamformer filter based on the fractional order beampattern, wherein M>2*N+1.

18. A non-transitory machine-readable storage medium storing instructions which, when executed, cause a processing device to:

specify a target directivity factor (DF) value for a differential microphone array (DMA) with a number M of microphones;

generate an N order beampattern for the DMA, wherein N is an integer and a first DF value corresponding to the N order beampattern is greater than the target DF value;

generate an N−1 order beampattern for the DMA, wherein a second DF value corresponding to the N−1 order beampattern is smaller than the target DF value; and generate a fractional order beampattern for the DMA, wherein a third DF value corresponding to the fractional order beampattern matches the target DF value and the fractional order beampattern comprises a first fractional contribution from the N order beampattern and a second fractional contribution from the N−1 order beampattern.

19. The non-transitory machine-readable storage medium of claim 18, further comprising instructions which, when executed, cause the processing device to generate a beamformer filter based on the fractional order beampattern, wherein M>2*N+1.

20. The non-transitory machine-readable storage medium of claim 18, wherein the M microphones of the DMA are arranged as one of a linear array or a circular array.

* * * * *